United States Patent [19]
Gold et al.

[11] Patent Number: 5,971,325
[45] Date of Patent: Oct. 26, 1999

[54] COMPENSATION FOR ROTORCRAFT PITCH AXIS CONTROL SATURATION

[75] Inventors: Phillip J. Gold, Shelton; Joseph T. Driscoll, Cheshire, both of Conn.

[73] Assignee: Sikorsky Aircraft Corporation, Stratford, Conn.

[21] Appl. No.: 08/996,692

[22] Filed: Dec. 23, 1997

[51] Int. Cl.⁶ .................................................. G05D 1/08
[52] U.S. Cl. .................. 244/180; 244/17.23; 244/17.25; 701/3
[58] Field of Search ................. 244/180, 17.25, 244/17.23; 318/610, 611; 701/3, 4, 5, 10

[56] References Cited

U.S. PATENT DOCUMENTS

| | | |
|---|---|---|
| 4,032,083 | 6/1977 | Maciolek . |
| 4,071,811 | 1/1978 | Irwin . |
| 4,420,808 | 12/1983 | Diamond et al. ........................ 364/434 |
| 4,628,455 | 12/1986 | Skutecki . |
| 5,058,824 | 10/1991 | Cycon et al. .......................... 244/17.13 |
| 5,152,478 | 10/1992 | Cycon et al. ............................ 244/12.2 |
| 5,428,543 | 6/1995 | Gold et al. . |
| 5,429,089 | 7/1995 | Thornberg et al. ....................... 123/352 |

*Primary Examiner*—Charles T. Jordan
*Assistant Examiner*—Tien Dinh
*Attorney, Agent, or Firm*—Seidel, Gonda, Lavorgna & Monaco, PC

[57] ABSTRACT

A control system for small unmanned rotorcraft compensates for vehicle pitch control saturation caused by the need for sudden vehicle pitch attitude correction, in turn often caused by wind gusts. The rotorcraft has a pitch-variable rotor system responsive to a vehicle pitch servo command for cyclically controlling rotor pitch and responsive to a collective servo command for collectively controlling rotor pitch. A compensating signal derived from the unlimited vehicle pitch servo command signal is cross-connected to the unlimited collective servo command signal to compensate for pitch control saturation, typically by reducing the magnitude of the resulting collective servo command signal. The compensating signal is derived by passing the unlimited vehicle pitch servo command signal through a dead band which responds as the signal approaches saturation and by preferably also then providing high and low frequency shaping to that signal.

14 Claims, 9 Drawing Sheets

COMPENSATION FOR ROTORCRAFT PITCH AXIS CONTROL SATURATION

TECHNICAL FIELD

The present invention relates to rotorcraft controls and more particularly to rotorcraft pitch axis control. More particularly still, the invention relates to compensation for pitch axis control saturation in rotorcraft flight vehicle control systems.

BACKGROUND OF THE INVENTION

The flight control of a rotorcraft differs in difficulty and complexity, at least to some extent, as a function of the size and character of the rotorcraft and the attendant operating conditions. Generally speaking, a larger more powerful aircraft may be more forgiving of a variety of changes in operating conditions than would a smaller less powerful aircraft. Still further, removal of the human pilot from within the rotorcraft, as by employing remote and/or autonomous control, may further complicate controllability.

A condition observed during remote control of a small unmanned aerial vehicle (UAV) of the rotorcraft type having a low power-to-weight ratio and coaxial rotors, involves the difficulty in maintaining stable manual longitudinal (pitch) control, particularly in response to rapid shifts in pitch attitude resulting from wind gusts and the like. For example, when the rotorcraft pitches nose up as the result of an input such as a wind gust, the operator will attempt to compensate with an appropriate nose down pitch control response. However, depending upon the rate and magnitude of the corrective action required, the pitch servo control may be driven to saturation, thus limiting the requisite response. In an extreme instance, failure to provide the requisite pitch control for the rotorcraft may result in loss of its control. In an effort to avoid that consequence, the operator may attempt to manually reduce the collective control when the pitch control saturates. However, that action as well requires careful monitoring of the pitch control and rapid adjustment of the collective control, which may severely test the dexterity of the operator flying the UAV rotorcraft. Indeed, it may not be possible to manually respond with sufficient speed and accuracy to avoid loss of control of the rotorcraft.

SUMMARY OF THE INVENTION

An object of the present invention is to provide a control system for a rotorcraft flight vehicle which automatically compensates for vehicle pitch control saturation. A further object of the invention is to provide a control system for a relatively small rotorcraft flight vehicle which facilitates remote or automatic control of the vehicle under adverse wind conditions.

These and other objectives are provided by a control system for a flight vehicle having a pitch-variable rotor system which is responsive to a vehicle pitch servo command signal for cyclically controlling rotor pitch and responsive to a collective servo command signal for collectively controlling rotor pitch, the control system having means for providing an unlimited vehicle pitch servo command signal, means for providing an unlimited collective servo command signal and signal conditioning means responsive to the unlimited vehicle pitch servo command signal for providing the vehicle pitch servo command signal and responsive to the unlimited collective servo command signal and additionally to the unlimited vehicle pitch servo command signal for providing the collective servo command signal to compensate for vehicle pitch control saturation.

The signal conditioning means of the control system includes dead band means responsive to the unlimited vehicle pitch servo command signal for providing a shaped vehicle pitch servo command signal having a dead band range and summing means responsive to the shaped vehicle pitch servo commanding signal and to the unlimited collective servo command signal for providing the collective servo command signal to compensate for pitch control saturation. The signal conditioning means may further include low frequency response means and/or high frequency response means each connected serially with the dead band means for further shaping the pitch servo command signal provided to the summing means. Preferably, both the low frequency response means and the high frequency response means are included and are connected in parallel with one another. Independent gain setting means may be provided for each of the low frequency response means and the high frequency response means.

The unlimited vehicle pitch servo command signal and unlimited collective servo command signal may be provided manually or automatically.

The described compensation for vehicle pitch control saturation results in an automatic adjustment of the collective servo command signal to maintain/retain control of the flight vehicle during circumstances of instability in flight operation. Selective shaping of the unlimited vehicle pitch servo command signal which is summed with the unlimited collective servo command signal further facilitates the control of the flight vehicle.

BEST MODE FOR CARRYING OUT THE INVENTION

Figure 1:
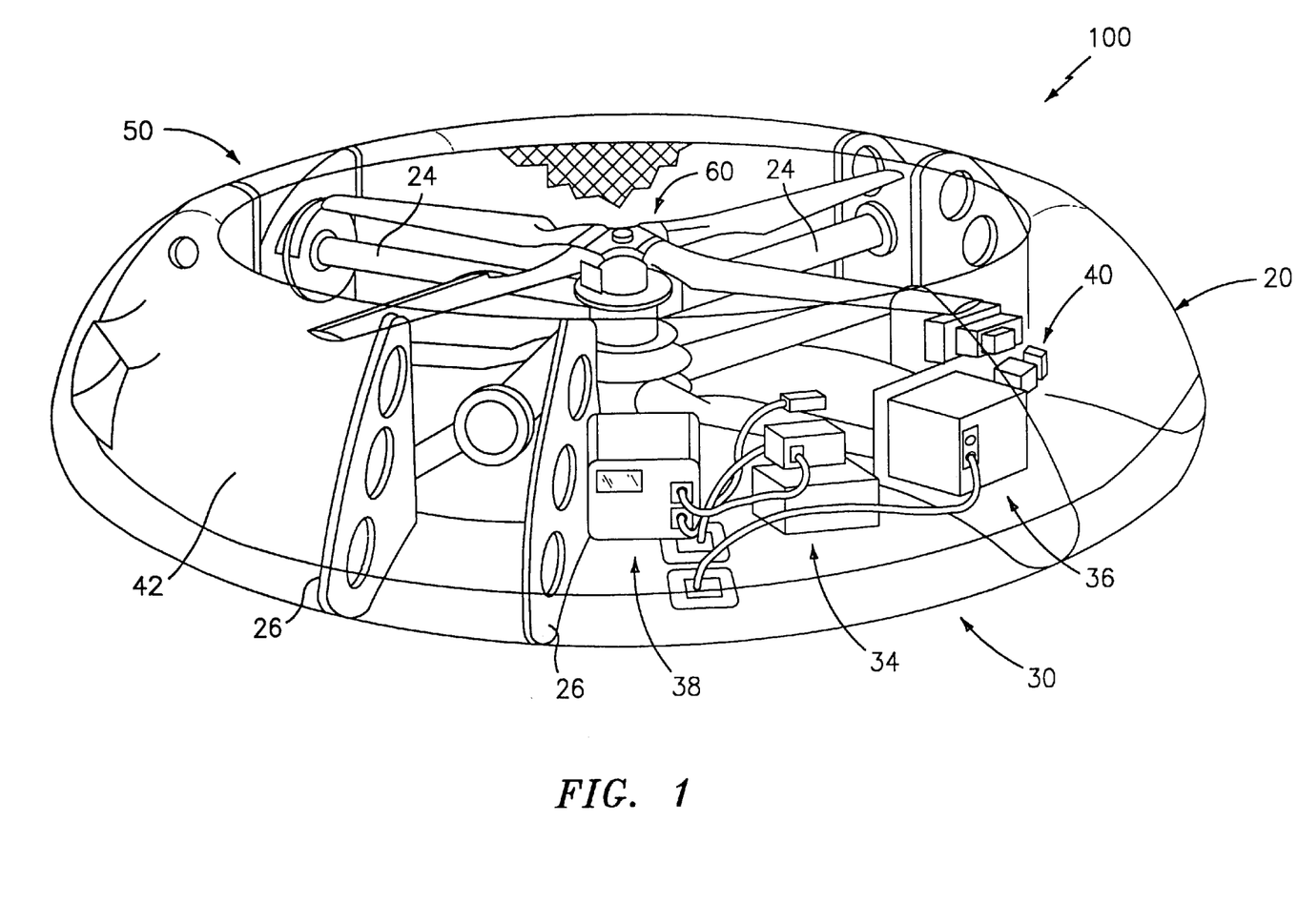
FIG. 1 is a perspective view, partially broken away, of an unmanned aerial vehicle (UAV) having a pitch control saturation compensated control system in accordance with the invention.

The pitch control saturation compensation control system of the invention is well suited for maintaining relatively stable control of a small, typically remote-controlled, rotorcraft under adverse conditions. The control system is particularly suited for a small, rotor-equipped, unmanned aerial vehicle (UAV) having coaxial counterrotating rotors such as illustrated in FIG. 1, to facilitate control during wind gusts and the like. The UAV may typically weigh several hundred pounds and have a relatively modest power-to-weight ratio. The control system will be described with respect to a manually remotely-controlled rotorcraft UAV, but will similarly be applicable to such UAV's capable of autonomous, typically preprogrammed, flight. Moreover, it should be understood that while the UAV is normally presumed to move in a forward direction relative to the vehicle's internal frame of reference and thus the invention of the control system is applicable to and described in connection with the vehicle pitch axis, it may additionally be applicable to the vehicle roll axis if significant lateral movement of the vehicle is anticipated.

Referring to FIG. 1, one embodiment of a UAV 100 is shown. This UAV 100 is of the type disclosed in U.S. Pat. Nos. 5,058,824, 5,152,478 and 5,429,089 owned by Sikorsky Aircraft Corporation. The UAV used in the example of the present invention comprises a toroidal fuselage or shroud 20 having an aerodynamic profile, flight/mission equipment 30, a power plant subsystem 50, and a pitch-variable rotor assembly 60. The toroidal fuselage 20 is provided with a plurality of support struts 24 which are attached to the rotor assembly 60 and are operative to support the rotor assembly 60 in fixed coaxial relation with respect to the toroidal fuselage 20. The toroidal fuselage 20 contains forward located internal bays 26 which are typically utilized for sundry flight/mission equipment 30 as described herein below. Flight/mission equipment 30 such as avionics 34, navigation equipment 36, flight computer 38, communications gear 40 (for relaying real time sensor data and receiving real time command input signals) antenna 42, etc. are distributed in the various internal bays 26 as shown in example in FIG. 1. Distribution of the various flight/mission equipment 30 is optimized in conjunction with the placement of a power plant subsystem 50 within the toroidal fuselage 20.

The flight/mission equipment 30 described thus far is exemplary for the type which maybe used in a UAV. However, as will be understood by those skilled in the art, separate flight control computer avionics and navigation systems are not necessarily required in order to perform the functions identified in the present invention. Alternately, a single flight control computer or mission computer may be provided to perform the above identified functions.

Figure 2:
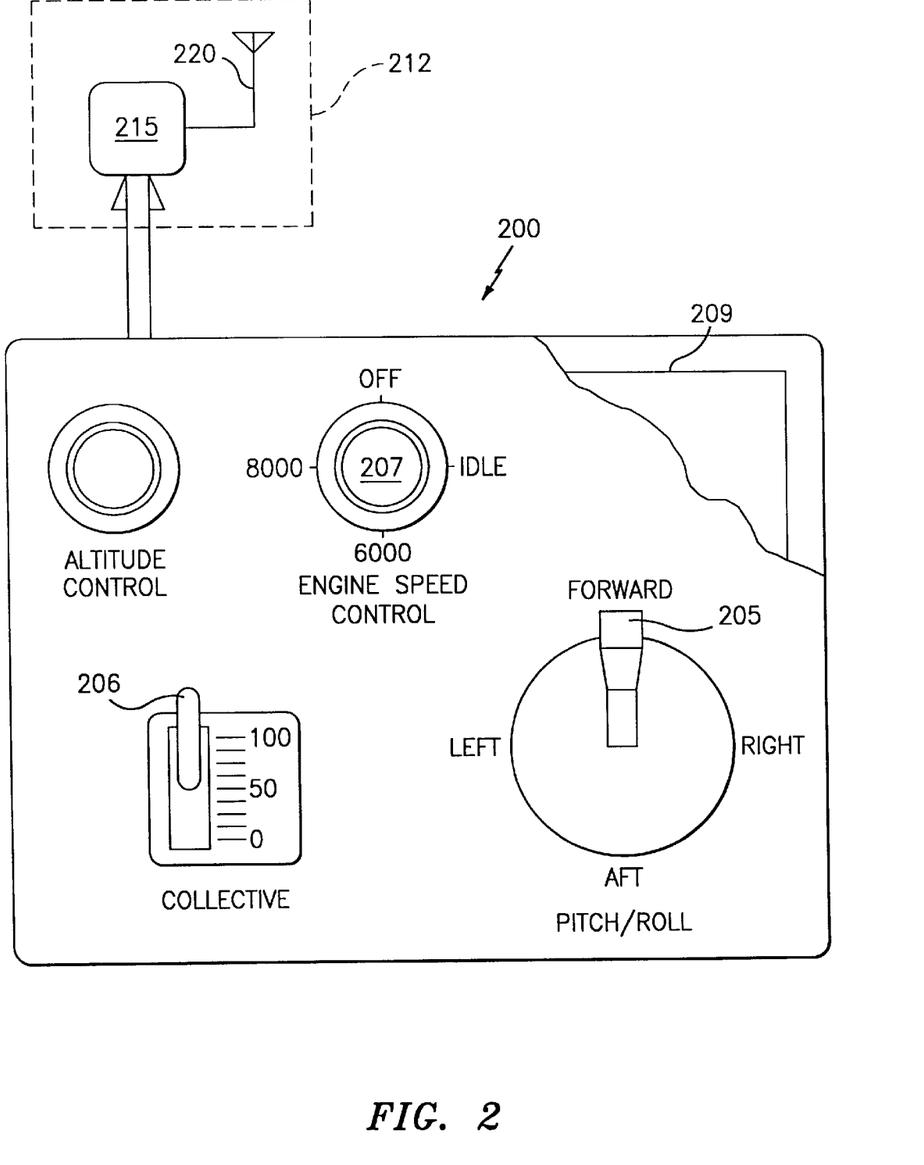
FIG. 2 is a simplified schematic block diagram, partially broken away, of an operator control panel for use with the UAV of FIG. 1.

Referring to FIG. 2, a control panel 200 for remote operation control for the UAV 100 (FIG. 1) is shown. The control panel provides control signals to the UAV to control the UAV engine and UAV rotor system to thereby direct the flight of the UAV. In the present example, the most significant load on the engine relates to the collective command provided to the rotor blades. By increasing the collective pitch of the rotor blades, the amount of lift or thrust produced by the blades is increased. Similarly, by reducing the rotor blade collective pitch, the amount of thrust being produced by the rotor blades is reduced. Additionally, for a given collective pitch setting or command, the load on the engine may be significantly increased or decreased by increasing or decreasing engine speed, respectfully. Another significant engine load is the rotor blade cyclic pitch. The cyclic pitch of the rotor blades is changed to allow control for the UAV flight direction. The control panel 200 is provided with a cyclic control stick 205 for providing cyclic control inputs. The cyclic control stick 205 is shown as being a two axis control stick wherein forward and aft movements of the control stick relate to vehicle pitch, and side-to-side movements of the control stick relate to roll. A collective control stick 206 is provided to change the collective pitch of the UAV rotor blades, and engine speed control 207 is provided for controlling the UAV engine speed. The engine speed control provides the desired engine speed (engine speed reference) at which the UAV engine attempts to operate. A control panel computer 209 is provided for receiving the control commands provided by the cyclic control stick 205, the collective control stick 206, and the engine speed control 207, and converting them into signals to be transmitted via communications equipment 212. The communications equipment 212 comprises a transmitter 215 for receiving the control commands provided from the control panel computer 209 and for transmitting the control commands via a control panel antenna 220.

The control commands from antenna 220 of the control panel 200 are received at antenna 42 of UAV 100 and are processed via the flight/mission equipment 30, as by computer 38, to provide the various control signals for controlling the UAV 100. For the most part, the signal processing is done in a conventional manner to provide control signals which act in accordance with known control laws to control the flight of UAV 100. However, in accordance with the invention, the flight computer 38 and other circuitry associated with the collective and the vehicle pitch control functions are constructed and programmed to provide the pitch control saturation compensation of the invention, as will be hereinafter described in detail.

Figure 3A:
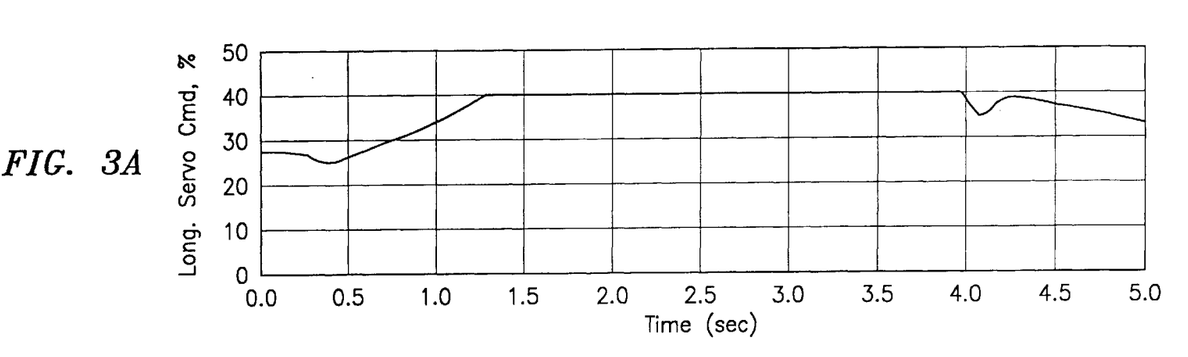
FIGS. 3a–3d are representative graphical depictions of UAV control parameters, including pitch rate response, for a control system containing no compensation for pitch control saturation.
Figure 3B:
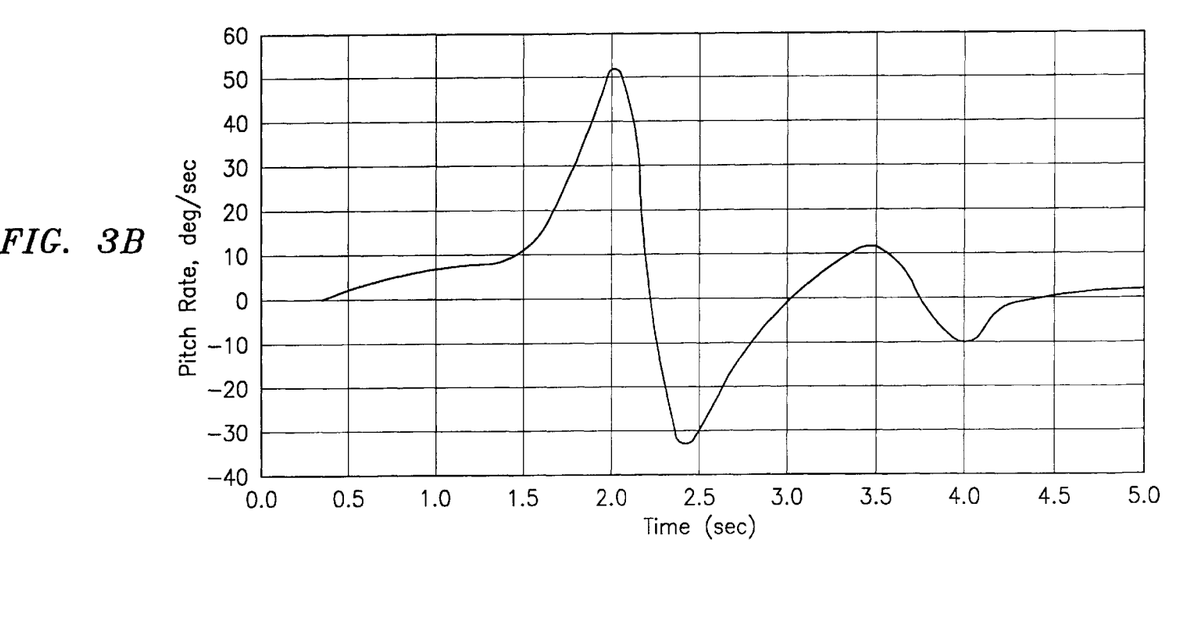

FIGS. 3a–3d graphically depict UAV control parameters, including pitch rate response, for a prior art control system which contains no compensation for pitch control saturation. The depicted situation is one in which the vehicle pitch axis control, as represented by the longitudinal (or pitch) servo command of FIG. 3a, has reached a forward limit condition of saturation (at 1.25 seconds). This condition is likely precipitated by the need for a rapid correction in the vehicle pitch attitude as the result of a wind gust causing a nose up orientation. However, the magnitude and rate of the rapid correction causes the pitch axis control to saturate, which in turn, as depicted in FIG. 3a, causes a rapid uncontrolled change in the pitch rate (1.5–2.0 seconds) which causes the UAV 100 to rapidly diverge from trimmed flight. The result may be complete loss of control of the aircraft. Although in the prior art it had been known to minimize such divergence from trimmed flight in the pitch axis by manually reducing the collective, the operator is generally not able to anticipate wind gusts nor to respond quickly enough to avoid potentially serious consequences. This is reflected in the relatively modest reduction in the collective servo signal depicted in FIG. 3c and the modest increase in engine RPM in FIG. 3d.

Figure 4:
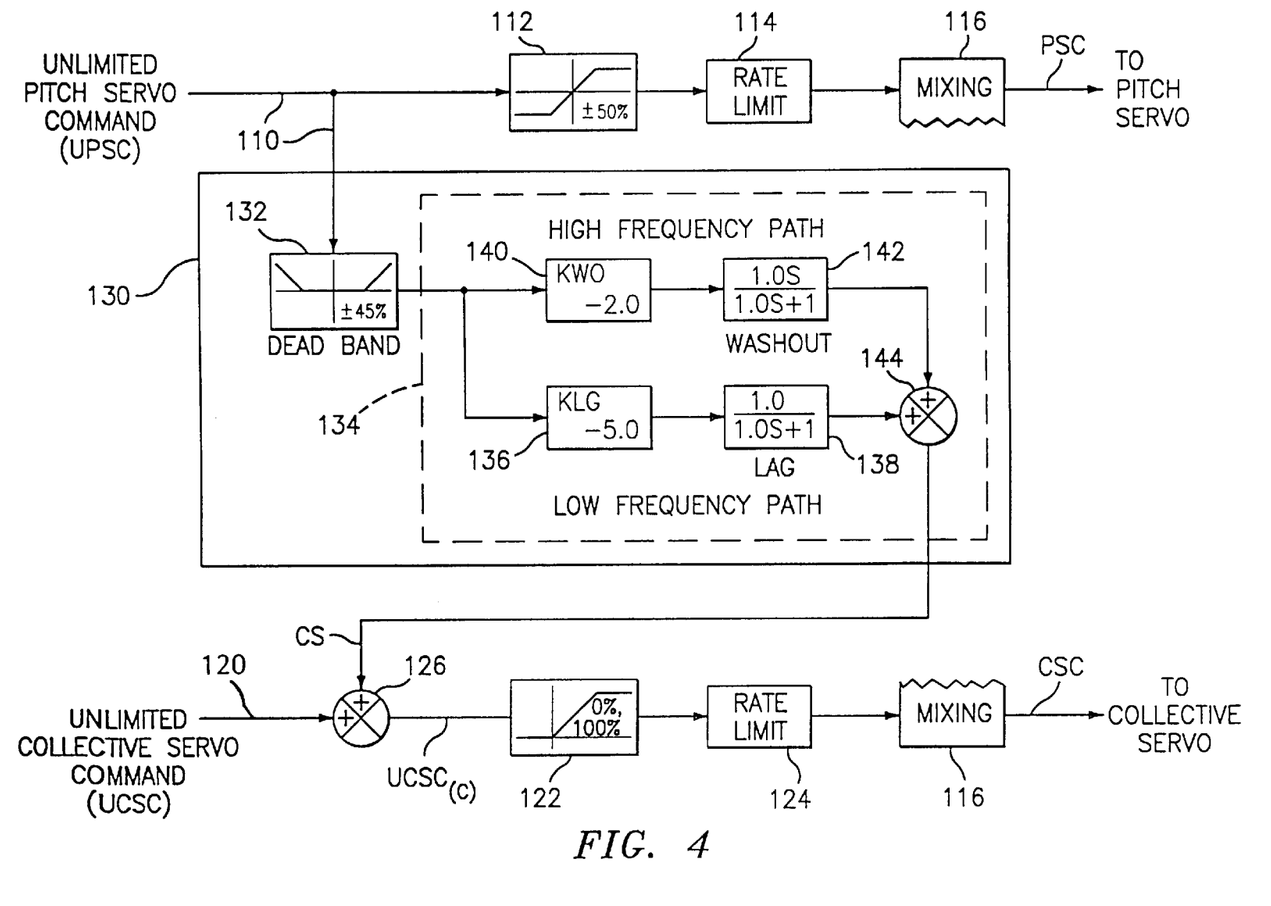
FIG. 4 is a schematic block diagram of an embodiment of the pitch control saturation compensated control system in accordance with the invention.

Referring to FIG. 4, there is depicted a schematic block diagram embodying a vehicle pitch control saturation compensation algorithm for a rotorcraft flight control system in accordance with the invention. An Unlimited Pitch Servo Command signal (UPSC) and is an Unlimited Collective Servo Command signal (UCSC) are available from control input sources, as for instance from the cyclic control stick 205 and the collective control stick 206, respectively, of control panel 200 and transmitted from control panel antenna 220 and received at UAV 100 via antenna 42 and communications gear 40. In prior flight control systems for controlling the pitch servo and the collective servo of an aircraft such as UAV 100, as well as in the present invention, the UPSC and the UCSC signals are extended via respective independent channels or paths, 110 and 120 respectively, to a known mixing unit 116 (not shown in detail) and thence as respective a Pitch Servo Command signal (PSC) and a Collective Servo Command signal (CSC) to respective pitch and collective servos of conventional design (not shown) for longitudinal (pitch) and collective control of the aircraft, respectively. The UPSC signal inputted to channel 110 has been, and continues to be, amplitude and rate limited by authority or amplitude limiter 112 and rate limiter 114, pitch servo. Similarly, the rate limiter 114 limits the rate of change of the ultimate pitch servo command signal.

The UCSC signal inputted to channel 120 has been, and continues to be, amplitude and rate limited by authority or amplitude limiter 122 and rate limiter 124. The authority limiter 122 is depicted as having 100%, or full, control authority such that the collective servo commands are within the limits of the collective servo. Similarly, the rate limiter 124 limits the rate of change of the ultimate collective servo command signal.

In addition to the aforedescribed conventional processing of the UPSC and UCSC signals, the control system of the invention provides for a compensating signal (CS) derived from the UPSC signal, which is cross-connected (fed) to the collective axis for combination with the UCSC signal to compensate for pitch control saturation. More specifically, that compensating signal is derived by passing the UPSC signal at least through a dead band and preferably, also through appropriate shaping.

Referring to the invention and FIG. 4 in greater detail, signal processing circuitry generally designated 130 receives the UPSC signal from line 110 as an input and provides a compensating signal CS as its output. The compensating signal CS is summed with the UCSC signal of line 120 via a summing junction 126 preparatory to the UCSS being applied to limiters 122 and 124. The signal provided as the output of summing junction 126 is designated UCSC$_{(c)}$ to reflect the inclusion of compensation for pitch control saturation. The signal processing circuitry 130 includes a dead band function 132 which receives the unlimited pitch servo command signal UPSC as its input. The UPSC signal, because it is not yet limited and is of ample magnitude, does not require a large control gain and thus contributes to the stability of the cross-coupled signal. The dead band function 132 includes a dead band of ±45%, such that it provides an output from the UPSC signal only when UPSC exceeds ±45%.

In providing a basic form of compensating signal CS in accordance with the invention, the output of dead band function 132 may be connected directly to summing junction 126 without further shaping. If this is done, the arithmetic sense of CS and the resultant operation performed at summing junction 126 will need to be such that the UCSC is relatively attenuated by CS to reduce the collective when the pitch servo approaches saturation.

Figure 3C:
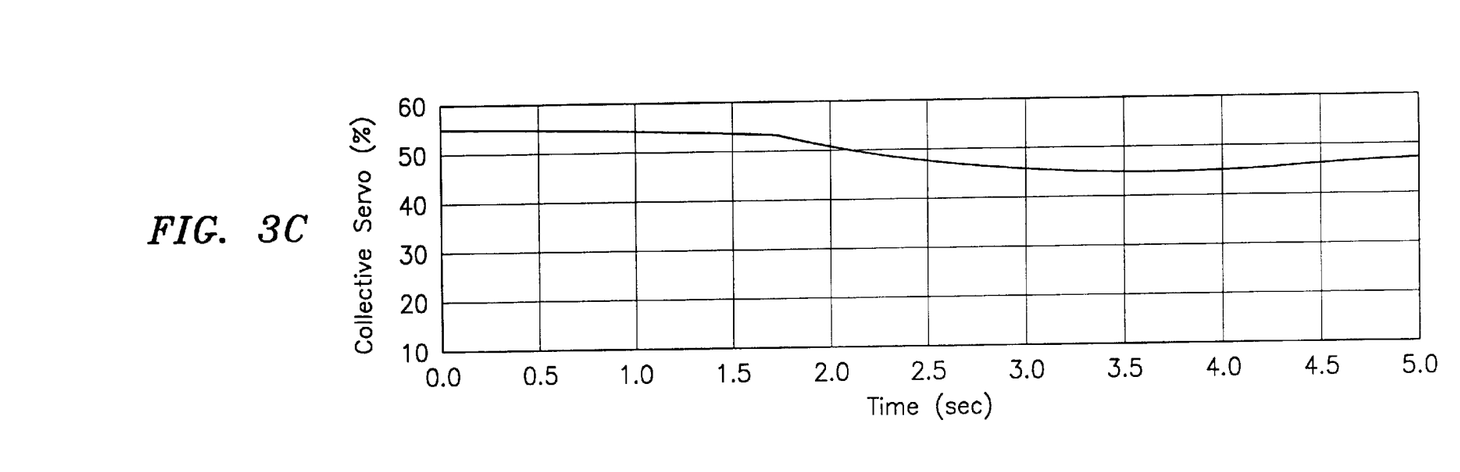
Figure 3D:
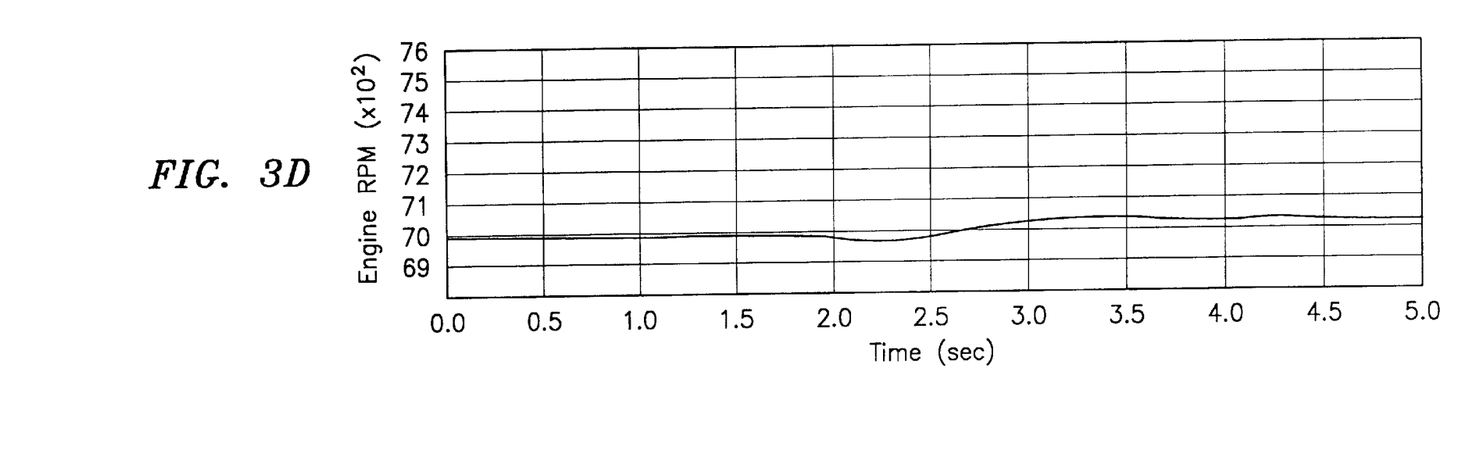
Figure 5A:
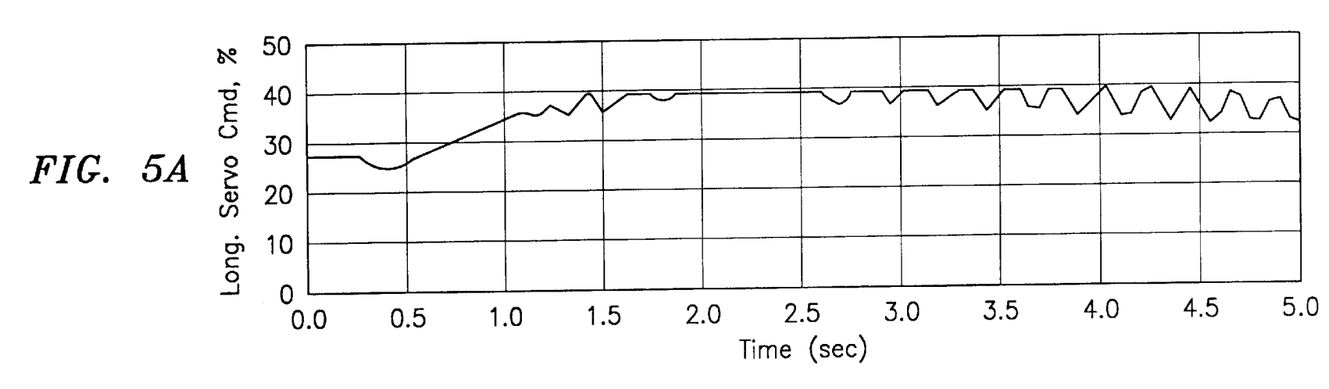
FIGS. 5a and 5b are traces A and B, is a representative graphical depictions of certain UAV control parameters for a control system containing basic compensation for pitch control saturation.
Figure 5B:
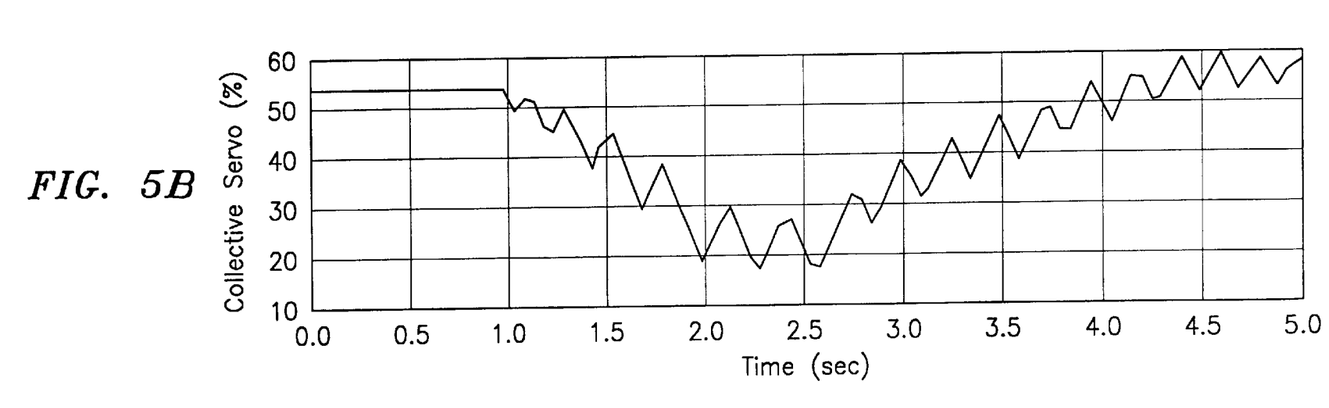

FIGS. 5a and 5b correspond functionally with FIGS. 3a and 3c, yet now depict those functional responses as a result of the compensating signal CS formed by passing the UPSC signal through dead band 132 and being cross-connected to the UCSC signal for controlling the collective. It will be noted in FIG. 5a that the pitch (longitudinal) servo limit (saturation) may or may not be reached, but its rate and duration are reduced. Further, importantly, it will be noted in FIG. 5b that the increase in the pitch servo command in FIG. 5a is now accompanied by a large reduction in the collective servo command, thus enhancing the stability of UAV 100 by avoiding a prolonged period of pitch saturation.

Although the aforedescribed development of a compensating signal CS by cross-connecting the UPSC signal modified only by dead band 132 provides a significant improvement in stability performance, it will nevertheless be noted that oscillations or cycling in the pitch and collective signals remain. Significant further improvement is obtained when shaping is added to the compensation path.

Referring again to FIG. 4, shaping is added to the compensating signal at the output of dead band 132 via the shaping function, or functions, represented within the broken-line region 134. The shaping function includes a low frequency path and preferably also, a high frequency path in parallel therewith. The low frequency path for shaping the compensating signal is connected serially with the output of dead band 132, and includes a gain function 136 and a low-pass lag filter 138. The lag filter serves to attenuate and substantially remove the limit cycling of the pitch and collective signals.

Further improvement is seen with the addition of the high frequency path, which is connected serially with the output of dead band 132 and in parallel with the low frequency path, and includes a gain function 140 and a high-pass washout filter 142. Inclusion of this high frequency path preserves, or recovers, some of the high frequency response or crispness otherwise sacrificed if only the low frequency path is used. The absolute and relative contributions of the low and the high frequency paths are governed by the gain functions 136 and 140 respectively. Similarly those gain functions are used to represent the arithmetic sense of the gains. In the illustrated example, the low frequency gain contribution (−5) at 136 is significantly greater than the high frequency gain contribution (−2) at 140. Moreover, the negative sense of those gains is maintained through the summation of the low and high frequency paths at summing junction 144 and results in the compensating signal CS having a similar negative sense such that its "addition" at summing junction 126 with the UCSC signal effectively results in a reduction or attenuation of that latter signal.

Figure 6A:
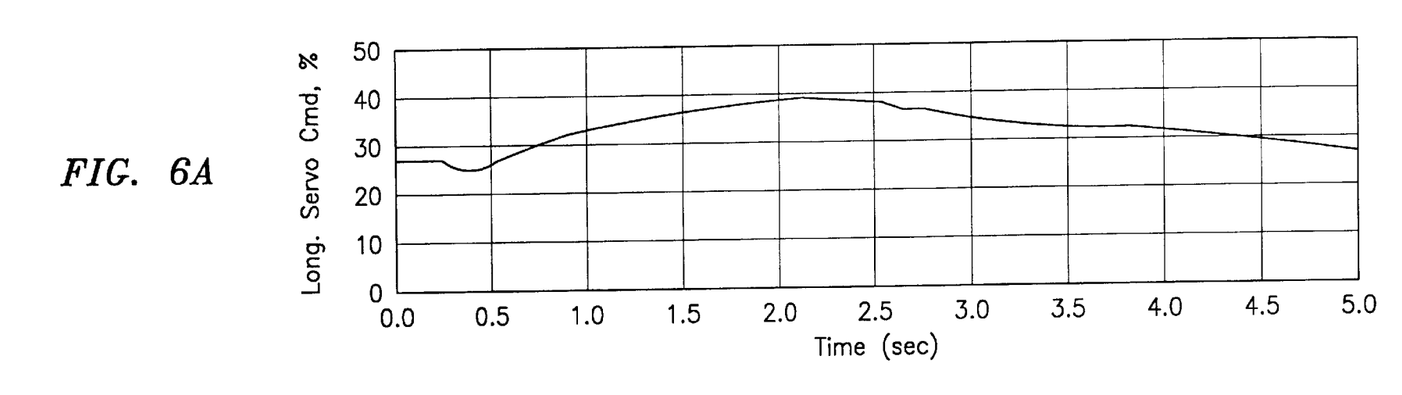
FIGS. 6a–6d are traces A through D is a representative graphical depictions of UAV control parameters, including pitch rate response, for the control system depicted in FIG. 4 containing shaped compensation for pitch control saturation.
Figure 6B:
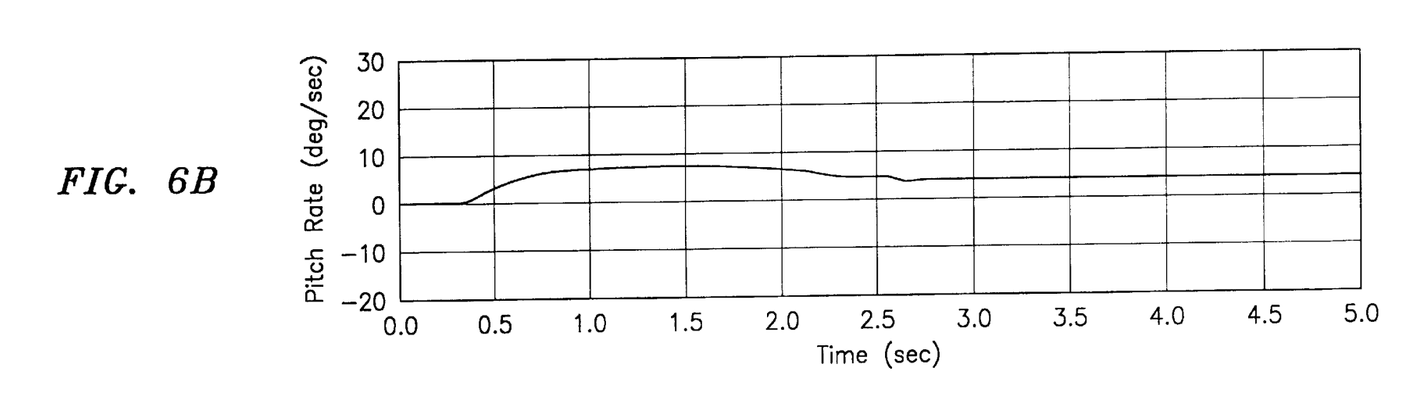
Figure 6C:
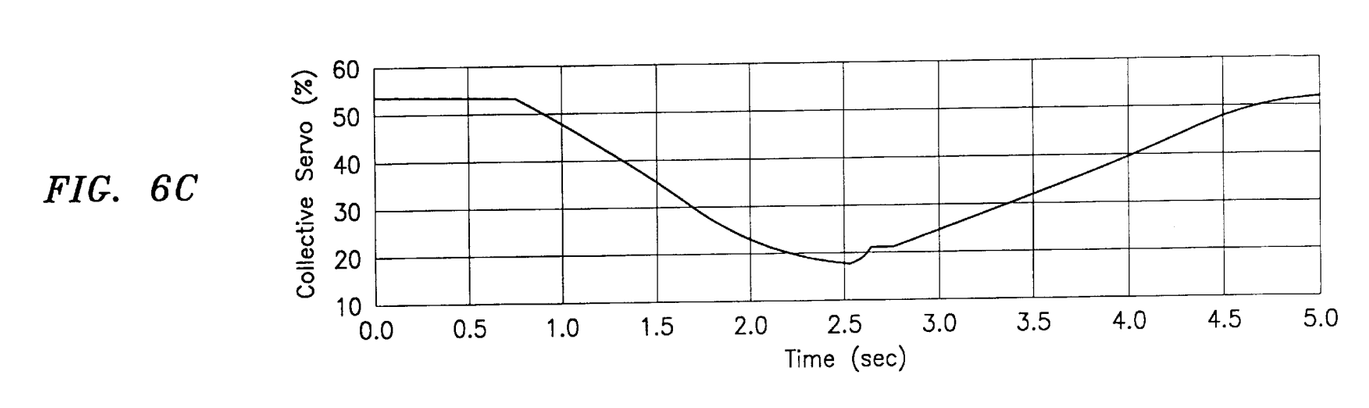
Figure 6D:
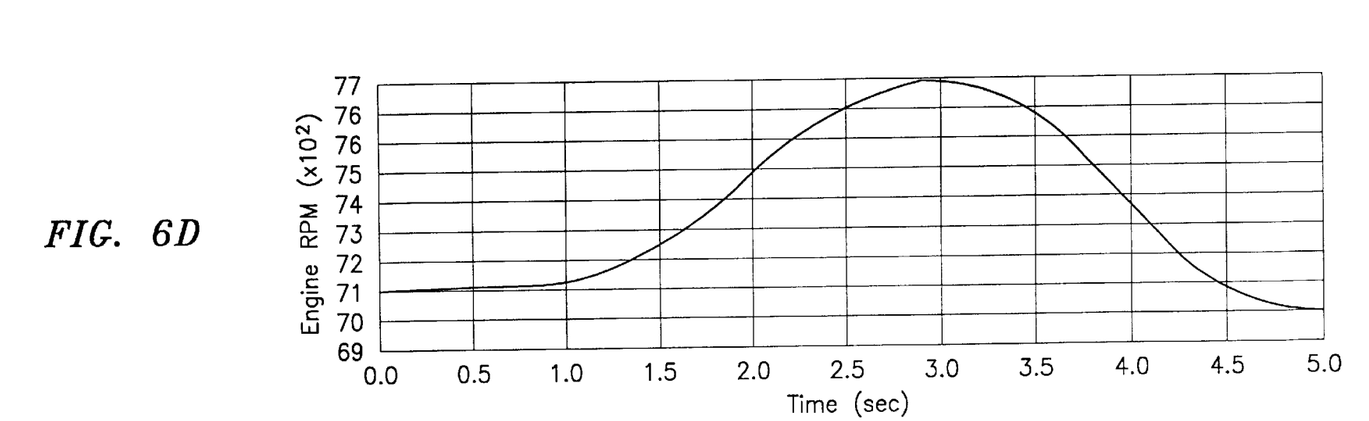

FIGS. 6a–6d depict the same UAV control parameters under the same conditions as depicted in FIGS. 3a–3d, however now with the benefit of the full pitch saturation compensation capabilities of the invention, including the shaping functions 134. It will be noted that the longitudinal (pitch) servo command of FIG. 6a approaches saturation but may not actually reach that limit Trace B importantly reveals that the pitch rate of the UAV is small and relatively gradual as a result of the compensation. The condition of extreme instability depicted in FIG. 3b, no longer occurs. FIG. 6c reveals the effect of the compensating signal CS on the collective axis control, as seen in the significant decline in the collective servo signal when the limited pitch servo signal approaches (but typically no longer reaches) a saturation limit. The dramatic, but temporary, reduction in the collective servo signal at that critical time provides the desired attenuation of the UAV pitch rate seen in FIG. 6b, thus also reducing the likelihood that the limited pitch servo command of FIG. 6a will be forced to its limit (saturation). Also, as would be expected with a significant reduction in the collective servo signal, FIG. 6d reveals a significant increase in engine speed as load is reduced.

Figure 7:
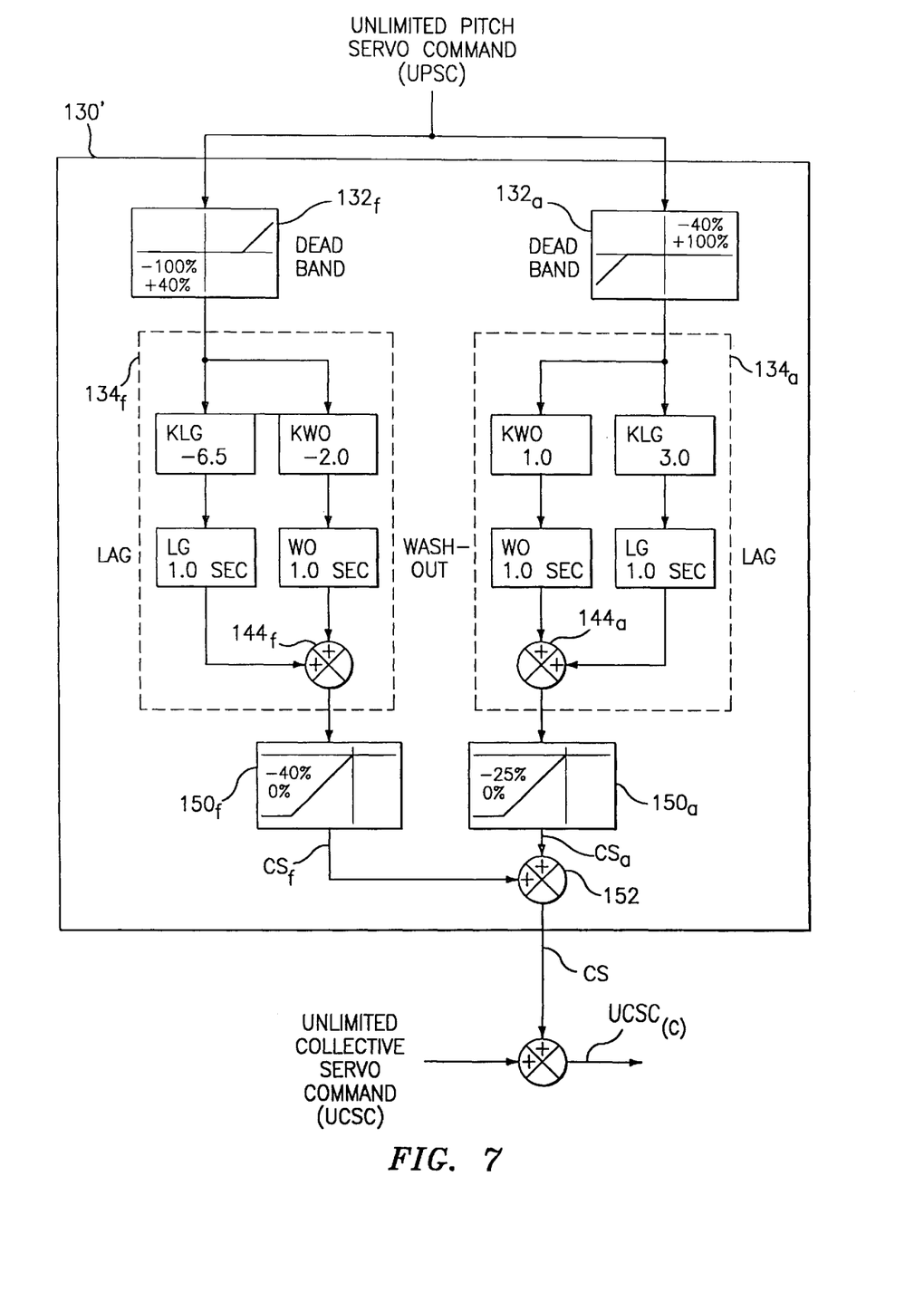
FIG. 7 is a schematic block diagram of a further embodiment of the pitch control saturation compensated control system in accordance with the invention.

Referring to FIG. 7, a pitch control saturation compensation system similar to that of FIG. 4 is depicted, however, with separate control paths for forward and aft pitch saturation compensation. In the interest of simplifying the description, functionally similar portions have been numbered similarly to FIG. 4, but with superscripts and/or subscripts identifying some degree of distinction. The portion within block 130' is functionally similar to block 130, but provides separate paths for developing compensating signals $CS_f$ for forward pitch saturation compensation and $CS_a$ for aft pitch saturation compensation. Thus there are dead bands $132_f$ and $132_a$ for forward and aft pitch saturation compensation respectively. Similarly, there are shaping functions $134_f$ and $134_a$.

The dead band 134f extends from −100% to +40% such that the forward pitch channel only responds to UPSC signals exceeding +40%. The dead band 134a similarly only responds to UPSC signals exceeding −40% in the negative sense. The shaping functions 134f and 134a are functionally similar to that of shaping function 134 in FIG. 4, however, it will be noted in FIG. 7 that the gain constants associated with the forward pitch shaping function are of relatively greater magnitude than for those associated with the aft pitch shaping function. This is because of the requirement for relatively greater compensation for forward pitch control than for aft pitch control. Further, the gain constants associated with the forward pitch shaping function are of a negative arithmetic sense, as in FIG. 4, so as to effect a reduction in the UCSC signal via summing junction 126. Conversely, the gain constants associated with the aft pitch shaping function are of a positive arithmetic sense because the output of dead band 132a is a negative signal. In this way, the arithmetic sense of the signal provided by either the forward or aft shaping functions, $134_f$ or $134_a$, respectively, is negative.

In addition to the shaping functions 134f and $134_a$, the respective forward and aft pitch channels also include limiters $150_f$ and $150_a$ receiving inputs from summing junctions $144_f$ and $144_a$ respectively, to limit the authority of the resulting compensating signal and thus also the authority of the collective servo command. The outputs of limiters $150_f$ and $150_a$ are compensating signals $CS_f$ and $CS_a$ respectively, which in turn are passed through summing junction 152, which in this instance is serving as a logical OR function since only one control path can be active at any given time. The output of summing junction 152 is the compensating signal CS which is applied to summing junction 126, as discussed previously with respect to FIG. 4.

Although the signal processing function of the invention has been presented in block diagram schematic form, it will be understood that the functions are readily accomplished by those skilled in the art, using appropriate known digital and/or analog signal processing/conditioning equipment and techniques. In the described embodiment, that processing/conditioning is typically accomplished via flight computer 38 aboard the UAV 100. Of course it may also be possible to locate a portion of the signal processing/conditioning within the ground-based control unit, unless the UAV is capable of autonomous flight.

Although the invention has been shown and described with respect to detailed, exemplary embodiment(s) thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below:

What is claimed is:

1. A control system for a flight vehicle having a pitch-variable rotor system responsive to a vehicle pitch servo command signal for cyclically controlling rotor pitch and responsive to a collective servo command signal for collectively controlling rotor pitch, the control system comprising: means for providing an unlimited vehicle pitch servo command signal, means for providing an unlimited collective servo command signal, and signal conditioning means responsive to the unlimited vehicle pitch servo command signal for providing a modified unlimited vehicle pitch servo command signal for combining with the unlimited collective command signal to generate the collective servo command signal compensated for vehicle pitch control saturation.

2. The control system of claim 1 including a programmed controller, said programmed controller being programmed to provide said unlimited vehicle pitch servo command signals and said unlimited collective servo command signals.

3. The control system of claim 1 including manual control means, said manual control means being responsive to manual inputs for providing said unlimited vehicle pitch servo command signals and said unlimited collective servo command signals.

4. The control system of claim 1 wherein said signal conditioning means includes dead band means responsive to said unlimited vehicle pitch servo command signal for providing the modified unlimited vehicle pitch servo command signal.

5. The control system of claim 4 wherein said signal conditioning means further includes low frequency response means connected serially with said dead band means for shaping the modified unlimited vehicle pitch servo command signal.

6. The control system of claim 5 wherein said signal conditioning means further includes high frequency response means connected serially with said dead band means for shaping the modified unlimited vehicle pitch servo command signal.

7. The control system of claim 6 wherein said low frequency response means and said high frequency response means are connected in parallel fashion and their respective outputs are summed to provide the modified unlimited vehicle pitch servo command signal.

8. The control system of claim 7 wherein said low frequency response means and said high frequency response means respectively each include independent gain setting means.

9. The control system of claim 4 wherein said modified unlimited vehicle pitch servo command signal is combined with said unlimited collective servo command signal via summing means to reduce the magnitude of the resultant collective servo command signal.

10. The control system of claim 8 wherein said gain setting means have a negative arithmetic sense such that said modified unlimited vehicle pitch servo command signal is arithmetically subtracted from said unlimited collective servo command signal via summing means to thereby reduce the magnitude of the resultant collective servo command signal.

11. The control system of claim 9 wherein the flight vehicle is a relatively small rotorcraft having co-axial rotors and a modest power-to-weight ratio.

12. The control system of claim 7 wherein said dead band means includes first and second dead band means, said low frequency response means includes first and second low frequency response means, said high frequency response means includes first and second high frequency response means, said first dead band means, low frequency means, and high frequency means being connected to form a first control path providing a first modified unlimited vehicle pitch servo command signal for forward vehicle pitch control, said second dead band means, low frequency means, and high frequency means being connected to form a second control path providing a second modified unlimited vehicle pitch servo command signal for aft vehicle pitch control, and wherein the first and second modified unlimited vehicle pitch servo command signals are mutually exclusive of one another in time and are provided to said summing means as said modified unlimited vehicle pitch servo command signal.

13. A control system for a flight vehicle having a pitch-variable rotor system responsive to a pitch servo command signal for cyclically controlling rotor pitch and responsive to a collective servo command signal for collectively controlling rotor pitch, the control system comprising:

first means for receiving an unlimited pitch servo command signal and for providing a pitch servo command signal;

second means for receiving an unlimited collective servo command signal and for providing a collective command signal; and a signal conditioner connected to the first means and responsive to the unlimited pitch servo command signal, the signal conditioner generating a compensation signal that is a function of the unlimited pitch servo command signal, the signal conditioner being connected to the second means for combining the compensation signal with the unlimited collective command signal to generate the collective servo command signal.

14. A flight control system for a flight vehicle having a pitch-variable rotor system responsive to a vehicle pitch servo command signal for cyclically controlling rotor pitch and responsive to a collective servo command signal for collectively controlling rotor pitch, the flight control system comprising:

a pitch control channel adapted to receive an unlimited pitch servo command signal, the pitch control channel outputting a pitch servo command signal that is a function of the unlimited pitch servo command signal;

signal processing circuitry connected to the pitch control channel and adapted to receive the unlimited pitch servo command signal, the signal processing circuitry adapted to convert the unlimited pitch servo command signal to a compensation signal; and a collective control channel adapted to receive an unlimited collective servo command signal and the compensation signal, the collective control channel being connected to the signal processing circuitry and adapted to combine the unlimited collective servo command signal and the compensation signal, the collective control channel outputting a collective servo command that is a function of the combination.

\* \* \* \* \*